United States Patent
Yamamoto et al.

[11] Patent Number: 5,886,803
[45] Date of Patent: Mar. 23, 1999

[54] BILATERAL OPTICAL TRANSMISSION SYSTEM AND OPTICAL TRANSCEIVER FOR PULSE INFORMATION

[75] Inventors: Takaya Yamamoto, Kawasaki; Katsuyuki Yamamoto, Tokyo; Shu Yamamoto, Shiki; Yotaro Yatsuzuka, Yokohama, all of Japan

[73] Assignee: Kokusai Denshin Denwa Kabushiki, Tokyo-To, Japan

[21] Appl. No.: 792,366

[22] Filed: Feb. 3, 1997

[30] Foreign Application Priority Data

Feb. 5, 1996 [JP] Japan .................................. 8-040317

[51] Int. Cl.$^6$ .................................................. H04B 10/00
[52] U.S. Cl. ........................ 359/152; 359/113; 359/158; 375/239
[58] Field of Search ..................... 359/113.125, 135.123, 359/137, 143, 152, 158, 184; 375/239

[56] References Cited

U.S. PATENT DOCUMENTS

| | | | |
|---|---|---|---|
| 5,255,111 | 10/1993 | Kwa ........................................ | 359/113 |
| 5,307,192 | 4/1994 | Schroder et al. ...................... | 359/135 |
| 5,631,757 | 5/1997 | Bodeep et al. ........................ | 359/113 |

Primary Examiner—Kiinfe-Michael Negash
Attorney, Agent, or Firm—Lackenbach, Siegel, Marzullo, Aronson & Greenspan

[57] ABSTRACT

A bilateral optical transmission system for pulse information disclosed which can accommodate variations in the relationship between the down-link signal transmission rate and the up-link one. A single bilateral optical transmission line is laid between first and second positions. A transmission pulse train with pulse transmission time slots set therein at fixed time intervals is provided onto the transmission line from the first position. A return pulse train is retransmitted from the second position to the first position over the bilateral optical transmission line. The return pulse train is obtained by gating the transmission pulse train with up-link information pulses from the second position to the first position in synchronization with up-link pulse transmission time slots for the transmission of the up-link information pulses so that at least one predetermined transmission time slot in each unit transmission period defined by a predetermined number of pulse periods in the transmission pulse train is used as the up-link pulse transmission time slot. At the first position, at least one time slot other than the up-link pulse transmission time slot in each unit transmission period is used as at least one down-link pulse transmission time slot for the transmission of down-link information pulses from the first position to the second position.

9 Claims, 16 Drawing Sheets

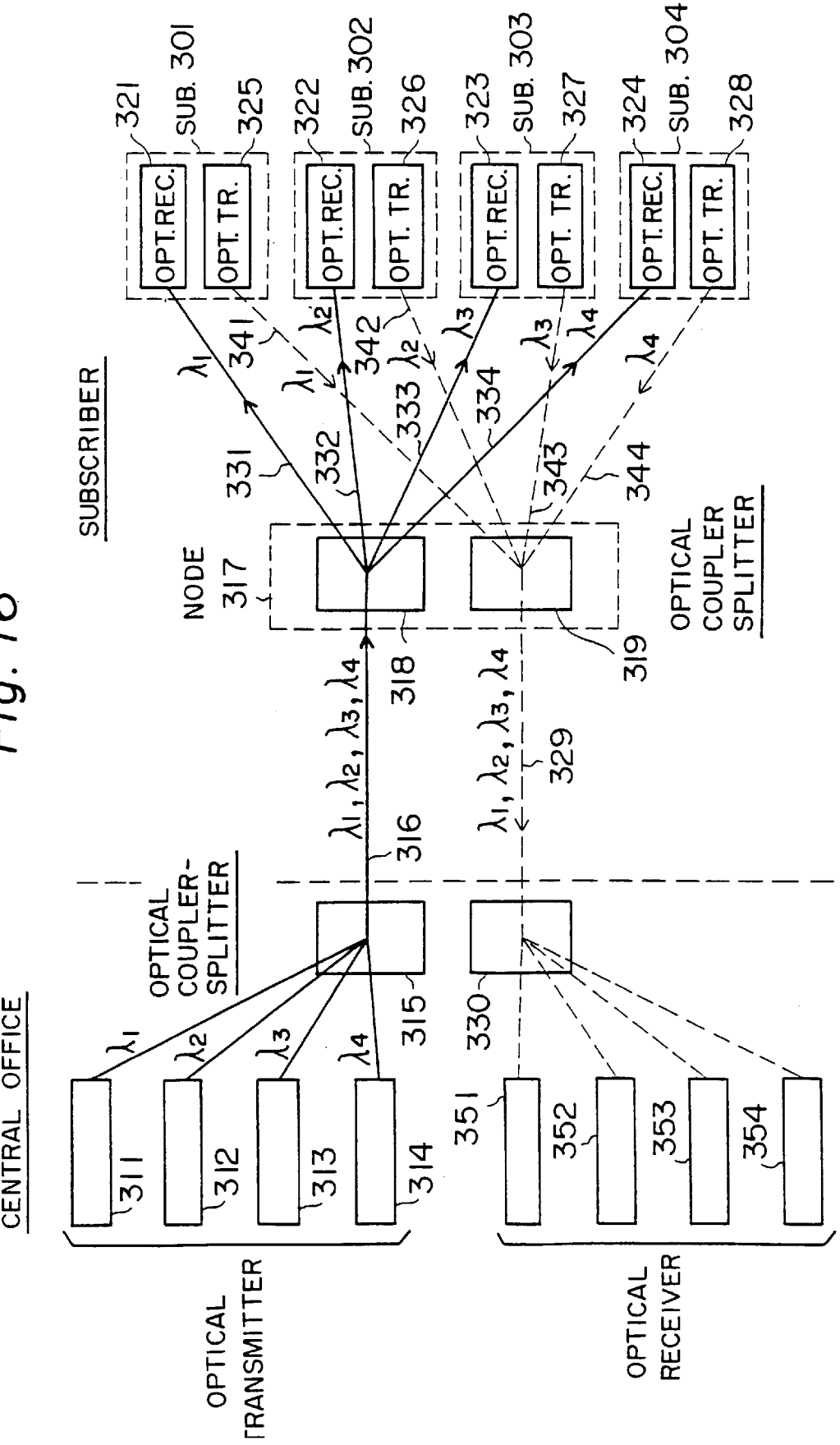

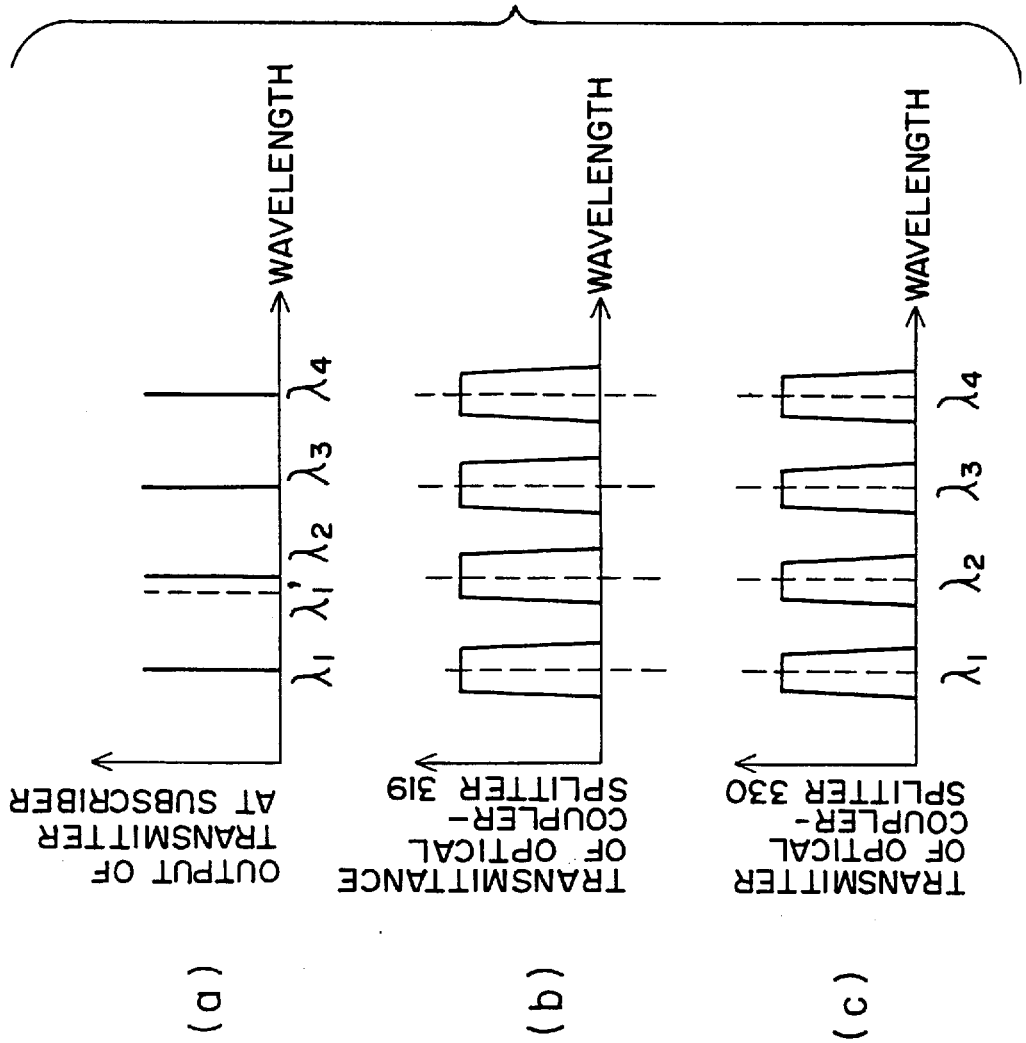

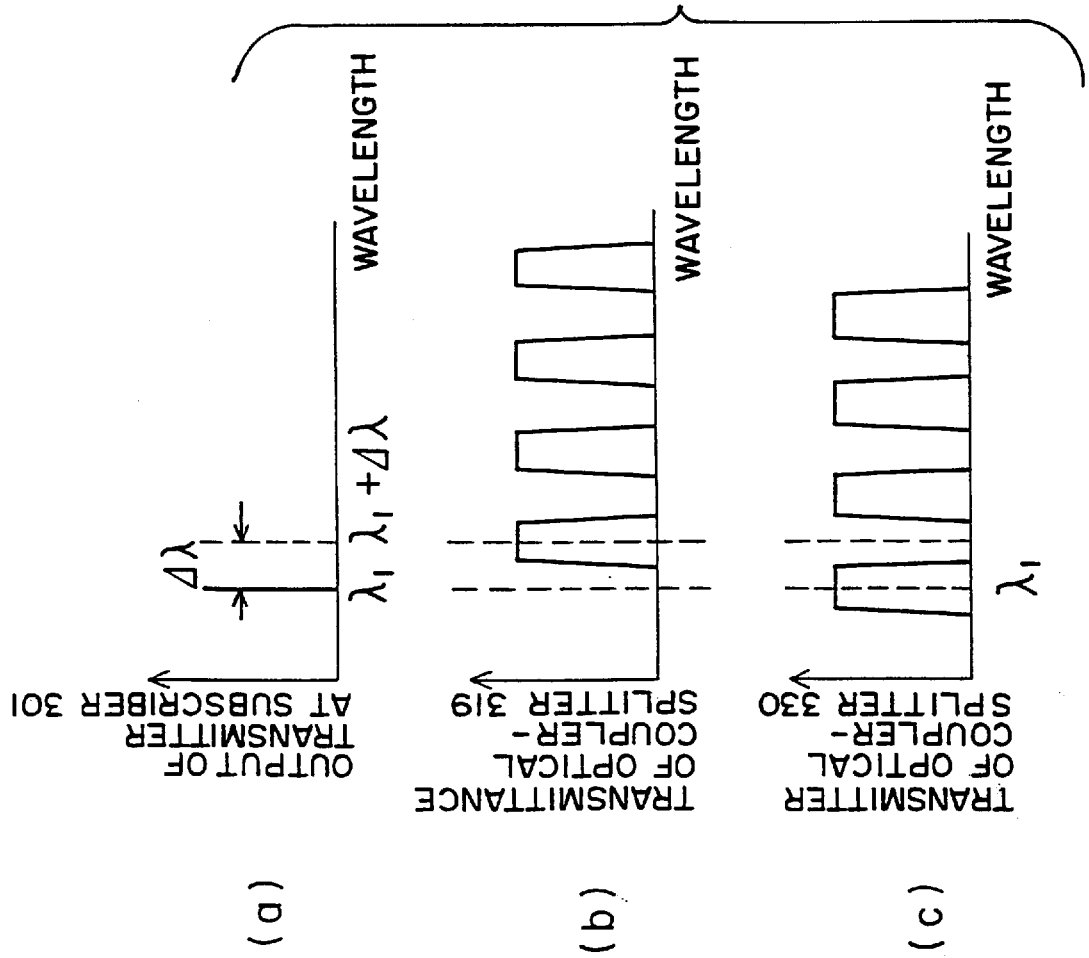

BILATERAL OPTICAL TRANSMISSION SYSTEM AND OPTICAL TRANSCEIVER FOR PULSE INFORMATION

BACKGROUND OF THE INVENTION

The present invention relates to a bilateral optical transmission system and an optical transceiver for pulse information which are used in an optical access system for optical subscriber communication or optical CATV employing a high density wavelength-multiplexing system.

One possible scheme that has been proposed to economically implement an optical access system is a single cable transmission system which transmits both up- and down-link optical signals over one optical fiber as disclosed in, for example, (P. J. Duthie, M. J. Wale, I. Bennion, and J. Hankey, "Bidirectional Fibre-Optic Link Using Reflective Modulation," *Electronics Letters*, vol. 22, no. 10, pp. 517–518, 1986. In FIG. 15 there is schematically shown a configuration of a single cable bilateral transmission system. Assume that the transmission rates from a central office to a subscriber and from the latter to the former are 560 and 34 Mb/s, respectively.

A 560 Mb/s optical signal is sent out from an optical transmitter 501 of the central office to a fiber optic transmission line 503 via a directional coupler 502. At the subscriber side a portion of the optical signal transmitted thereto is provided via an optical coupler 504 to an optical receiver 505, where it is demodulated. The remainder of the transmitted optical signal is fed to an optical modulator 506, and the 560 Mb/s down-link optical signal is envelope-modulated using information of the transmission rate 34 Mb/s, thereafter being provided via the directional coupler 504 onto the transmission line 503. At the central office side, the up-link optical signal is separated by the directional coupler 502 from the transmitted signal and is received by an optical receiver 507. The optical receiver 507 extracts only the 34 Mb/s signal by an integration circuit. This system is predicated on a condition that the transmission rate of the down-link signal is higher than that of the up-link signal.

Turning next to FIG. 16, a description will be given of an example which employs a wavelength multiplexing system in an access network from the central office to subscribers. Let it be assumed that to subscribers 301 to 304 are assigned wavelengths $\lambda_1$ to $\lambda_4$ (the number of subscribers in this example is four), respectively. Optical signals of wavelengths $\lambda_1$ to $\lambda_4$ from optical transmitters 311 to 314 of the central office are multiplexed by an optical coupler-splitter 315 and then provided onto one fiber 316. The optical signals are split, by an optical coupler-splitter 318 in a node 317 placed near the subscribers, into signals each corresponding to one subscriber, thereafter being received by optical receivers 321 to 324 of the subscribers via optical fibers 331 to 334. Such a network is commonly called a passive double star (PDS) network. As regards a message from the subscriber, for example, 301 to the central office, an optical signal of the wavelength $\lambda_1$ sent out from an optical transmitter 325 is transmitted over an optical fiber 341 to the node 317, where it is wavelength-multiplexed by an optical coupler-splitter 319 with optical signals from other subscribers transmitted over optical fibers 342 to 344, and the thus wavelength-multiplexed optical signals are transmitted to the central office over one fiber 329. In the central office, the multiplexed optical signals are split by an optical coupler-splitter 330 into signals of the respective wavelengths, which are fed to individual optical receivers 351 to 354.

In the optical access system employing the wavelength multiplexing scheme, the wavelengths are usually spaced 1 to 2 nm apart. The oscillation wavelength of a semiconductor laser as a light source undergoes a temperature change of 0.1 nm/°C. even if it is a distributed feedback laser. If the temperature of the optical transmitter placed in the subscriber's home varies 20° C., the oscillation wavelength will change by a value of 2 nm. When the wavelength of the optical transmitter 325 of the subscriber 301, initially set at a wavelength $\lambda_1$ as shown in FIG. 17(a), changes to a wavelength $\lambda_1'$ due to a change in the ambient temperature of the optical transmitter 325, a crosstalk to adjacent channels will occur even if the wavelength characteristics of the optical coupler-splitter 319 placed in the node 317 of the network and the optical coupler-splitter 330 of the central office do not vary as shown in FIGS. 17(b) and (c). To avoid this, it is necessary to stabilize the wavelength of the optical transmitter placed in the subscriber's station. In many cases, a Peltier element is used for temperature control of the light source in a quest to stabilize its wavelength.

The optical coupler-splitter of the node is mounted on a conduit or mast, and it is considered that freedom from maintenance is a precondition for the design of an economical system. Even if the wavelength of the optical transmitter 325 of the subscriber 301 is stabilized at a wavelength $\lambda_1$ as depicted in FIG. 18(a), the wavelength characteristic of the optical coupler-splitter 319 in the node 317 may sometimes shift by a value $\alpha\lambda$ due to adverse environmental conditions as shown in FIG. 18(b). Even if the optical coupler-splitter is formed of quartz glass, its wavelength characteristic undergoes a temperature change of 0.01 nm/°C. owing to the temperature dependency of the refractive index of quartz glass. A 100° C. temperature change (for example, an operating temperature of –40 to 65° C. is required outdoors) will cause a wavelength change of 1 nm. That is, $\Delta\lambda=1$ nm. This influence is serious in the high density wavelength multiplexing system. Provided that the wavelength characteristic of the optical coupler-splitter at the central office side is such as shown in FIG. 18(c), the optical signal (a) of the wavelength $\lambda_1$ from the optical transmitter 325 of the subscriber 301 is intercepted owing to the characteristic (b), and hence it does not reach the central office. Even if the optical signal is allowed to pass through the optical coupler-splitter 319 of the node 317 by changing a wavelength of the light source of the optical transmitter 325 to a value $\lambda_1+\Delta\lambda$, the optical signal is inhibited from the passage through the optical coupler-splitter 330 at the central office side, and hence it does not reach the optical receiver 351 of the central office.

No proposals have been made so far on a method for controlling output -wavelength from a light source in an optical network in which the wavelength characteristics of optical coupler-splitters and optical filters vary due to an ambient temperature change and on a wavelength multiplexing optical access system utilizing the method.

The traffic speed or transmission rate from the subscriber to the central office differs greatly for each subscriber. It is difficult to deal with this problem by the prior art as the transmission rate of the up-link signal approaches the down-link transmission rate. For example, when the subscriber is a TV station which distributes TV signals, the transmission rate of the down-link signal is lower than the transmission rate of the up-link signal, with which the prior art cannot cope. The optical access system needs to meet every subscriber's requirement about the transmission rate.

In ordinary optical access systems using the passive double star (PDS) scheme, optical coupler-splitters are provided in nodes at the central office side and at midpositions in the transmission lines for the up-link optical signal from the subscriber to the central office as well as for the down-link optical signal from the central office to the subscriber. Even if such optical coupler-splitters exhibit the same wavelength characteristic when placed in the same environment, their wavelength characteristics change when they are disposed in different environments. In such a situation, the wavelength multiplexing communication may sometimes be impossible; this problem becomes more severe in higher density wavelength multiplexing communications. The control function, which the optical transmitter of the subscriber is required to possess so as to overcome the problem, is not only control for wavelength stabilization of a light source but also wavelength control while monitoring variations in the wavelength characteristic of the network. This puts a heavy burden on the subscriber's terminal and hence inevitably raises its cost.

SUMMARY OF THE INVENTION

An object of the present invention is to provide a bilateral optical transmission system for pulse information which can accommodate variations in the relationship between the down-link signal transmission rate and the up-link one.

Another object of the present invention is to provide a bilateral optical transmission system and an optical transceiver for pulse information which permit the implementation of an economical, stable and easy-to-maintain optical access system in which subscribers' terminals and optical coupler-splitters in the node are maintenance-free and required control is effected on the part of the central office alone.

To attain the above objective, a bilateral optical transmission system for pulse information according to the present invention has a structure in which:

a single bilateral optical transmission line is laid between first and second positions;

a transmission pulse train with pulse transmission time slots set therein at fixed time intervals is provided onto the transmission line from the first position;

a return pulse train is retransmitted from the second position to the first position over the bilateral optical transmission line, the return pulse train being obtained by gating the transmission pulse train with up-link information pulses from the second position to the first position in synchronization with up-link pulse transmission time slots for the transmission of the up-link information pulses so that at least one predetermined transmission time slot in each unit transmission period defined by a predetermined number of pulse periods in the transmission pulse train is used as the up-link pulse transmission time slot; and at the first position, at least one time slot other than the up-link pulse transmission time slot in each unit transmission period is used as at least one down-link pulse transmission time slot for the transmission of down-link information pulses from the first position to the second position.

In the implementation of this invention system through the use of a bilateral optical transmission line, an optical transceiver is provided at the second position which comprises:

an optical coupler-splitter connected to the bilateral optical transmission line;

an optical transmitter for extracting the down-link information pulses demodulated from the optical pulses split by the optical coupler-splitter from the transmission pulse train and clock pulses of the up-link pulse transmission time slots other than the down-link pulse transmission time slots on which the down-link information pulses have been transmitted;

an optical gate circuit supplied with the optical pulses split by the optical coupler-splitter from the transmission pulse train, for performing a gate operation based on the up-link information pulses;

an optical gate controller for sequentially inserting the up-link information pulses into the up-link pulse transmission time slots and for gating the optical gate circuit by the optical pulses incident on the optical gate circuit in synchronization with the clock pulses of the up-link pulse transmission time slots; and sending means for supplying to the optical coupler-splitter optical pulses obtained at the output of the optical gate circuit so that said optical pulses are provided onto the optical transmission line.

A semiconductor laser optical amplifier can be used as the optical gate circuit.

A bilateral optical transmission system for wavelength-multiplexed pulse information according to the present invention has a structure in which:

a single bilateral optical transmission line is laid between first and second positions;

a plurality of transmission pulse trains each having pulse transmission time slots set therein at fixed time intervals are provided from the first position onto the bilateral optical transmission line while being wavelength-multiplexed at required wavelength intervals;

at the second position, the plurality of transmission pulse trains are split into respective wavelengths, and a return pulse train is retransmitted from the second position to the first position over the bilateral optical transmission line, the return pulse train being obtained by gating the transmission pulse trains on the basis of up-link information pulses from the second position to the first position in synchronization with up-link pulse transmission time slots for the transmission of the up-link information pulses so that at least one predetermined transmission time slot in each unit transmission period defined by a predetermined number of pulse periods for each wavelength is used as the up-link pulse transmission time; and at the first position, a plurality of said wavelength-multiplexed transmission pulse trains are split into respective wavelengths and at least one time slot other than the up-link optical pulse transmission time slot in each unit transmission period in the transmission pulse train for each wavelength is used as at least one down-link pulse transmission time slot for the transmission of down-link information pulses from the first position to the second position.

In accordance with an aspect of the present invention, a single bilateral optical transmission line is laid between first and second positions, and a transmission pulse train, in which pulse transmission time slots are set at fixed time intervals, is provided onto the transmission line from the first position. At the second position, a return pulse train is transmitted to the first position over the transmission line. The return pulse train is produced by gating the transmission pulse train on the basis of up-link information pulses from the second position to the first position in synchronization with an up-link pulse transmission time slot for the transmission of the up-link information pulses so that at least one predetermined transmission time slot in each unit transmission period defined by a predetermined number of pulse periods in the transmission pulse train is used as the up-link pulse transmission time slot. At the first position, at least one time slot other than the up-link pulse transmission time slot in each unit transmission period is used as at least one down-link pulse transmission time slot for the transmission of down-link information pulses from the first position to the second position. With this structure, a bilateral optical transmission system for pulse information is implemented.

In accordance with another aspect of the present invention, a bilateral optical transmission line is laid between first and second positions, and a transmission pulse train is sent from the first position to the second position. The transmission pulse train has set therein pulse transmission time slots at predetermined time intervals and is set so that at least one predetermined transmission time slot in each unit transmission period defined by a predetermined number of pulse periods in the transmission pulse train is used as an up-link pulse transmission time slot for the transmission of the up-link information pulses from the second position to the first position. At the second point, the transmission pulse train is received and a return pulse train is retransmitted to the first position over the bilateral optical transmission line. The return pulse train is produced by gating the transmission pulse train on the basis of the up-link information pulses in synchronization with the up-link pulse transmission time slots. At the first position, the return transmission pulse train is received from the bilateral optical transmission line and the up-link information pulses are extracted. With this construction, a bilateral optical transmission system for pulse information is implemented in which there is no particular need of a pulse source at the second position.

In accordance with another aspect of the present invention, a single bilateral optical transmission line is laid between first and second positions, and a plurality of transmission pulse trains, each having set therein pulse transmission time slots at fixed time intervals, are provided from said first position onto the bilateral optical transmission line while being wavelength-multiplexed at required wavelength intervals. At the second position, the transmission pulse trains are split into respective wavelengths and a return pulse train is retransmitted to the first position over the bilateral optical transmission line. The return pulse train is produced by gating the transmission pulse trains on the basis of up-link pulse information from the second to the first position in synchronization with an up-link pulse transmission time slot for the transmission of the up-link information pulses so that at least one predetermined transmission time slot in each unit transmission period defined by a predetermined number of pulse periods for each wavelength is used as the up-link pulse transmission time slot. At the first position, the plurality of wavelength-multiplexed transmission pulse trains are split into respective wavelengths and the time slots of the transmission pulse train of each wavelength in each unit transmission period, except the up-link pulse transmission time slots, are used as down-link pulse transmission time slots for the transmission of down-link information pulses from the first position to the second position. With this structure, a bilateral optical transmission system for wavelength-multiplexed pulse information is implemented.

Furthermore, the present invention is used to build an optical access system of the passive double star (PDS) scheme. Wavelengths $\lambda_1$ to $\lambda_m$ are assigned to m subscribers. In the central office, m optical transmitters for generating optical signals of the wavelengths $\lambda_1$ to $\lambda_m$ and an optical transmitter for generating an optical signal of a wavelength $\lambda_0$ to detect a wavelength variation of an optical coupler-splitter in a PDS node are placed, and optical signals of (m+1) wavelengths from these optical transmitters are coupled by an optical coupler-splitter disposed in the central office into a composite optical signal, which is provided on a transmission line. The composite optical signal is split by the optical coupler-splitter in the node into optical signals for the respective subscribers. In each subscriber's station, a part of the optical signal sent thereto is fed to an optical receiver to detect a down-link signal. The thus transmitted optical signal contains an optical pulse train for carrying up-link information as wel as the down-link signal. The remainder of the down-link optical signal is input into a semiconductor laser optical amplifier and is gated in synchronization with timing of the optical pulse train by turning ON and OFF the semiconductor laser optical amplifier in accordance with the up-link information pulses to be carried by the optical pulse train.

The resulting up-link optical signal is transmitted backward over the transmission line. At the optical coupler-splitter of the node the up-link optical signal is coupled with up-link optical signals from other subscribers and the optical signal of the wavelength $\lambda_0$ for detecting a wavelength shift of this optical coupler-splitter, and the composite optical signal is returned to the central office over the transmission line. In the central office, only the up-link optical signals transmitted backward thereto are fed to the optical coupler-splitter, by which they are branched to the respective optical receivers to detect the individual optical signals. The optical receiver, which receives the optical signal of the wavelength $\lambda_0$, detects a wavelength shift of the optical coupler-splitter placed in the node. The two optical coupler-splitters provided in the central office are adapted so that their wavelength characteristics can be controlled in accordance with the shift amount of the wavelength of the optical coupler-splitter in the node. The wavelength shift amount of the optical coupler-splitter in the node is also fed back to a wavelength stabilizer placed in the central office, by which the reference wavelengths of the (m+1) optical transmitters in the central office are also corrected.

BRIEF DESCRIPTION OF DRAWINGS

The present invention will hereinafter be described in detail with reference to accompanying drawings, in which

FIG. 16 is a block diagram showing an example of the optical access system using a conventional multiplexing system;

FIG. 17 is a diagram explanatory of shortcomings of the conventional system; and FIG. 18 is a diagram explanatory of other shortcomings of the conventional system.

DETAILED DESCRIPTION (Embodiment 1)

Figure 1:
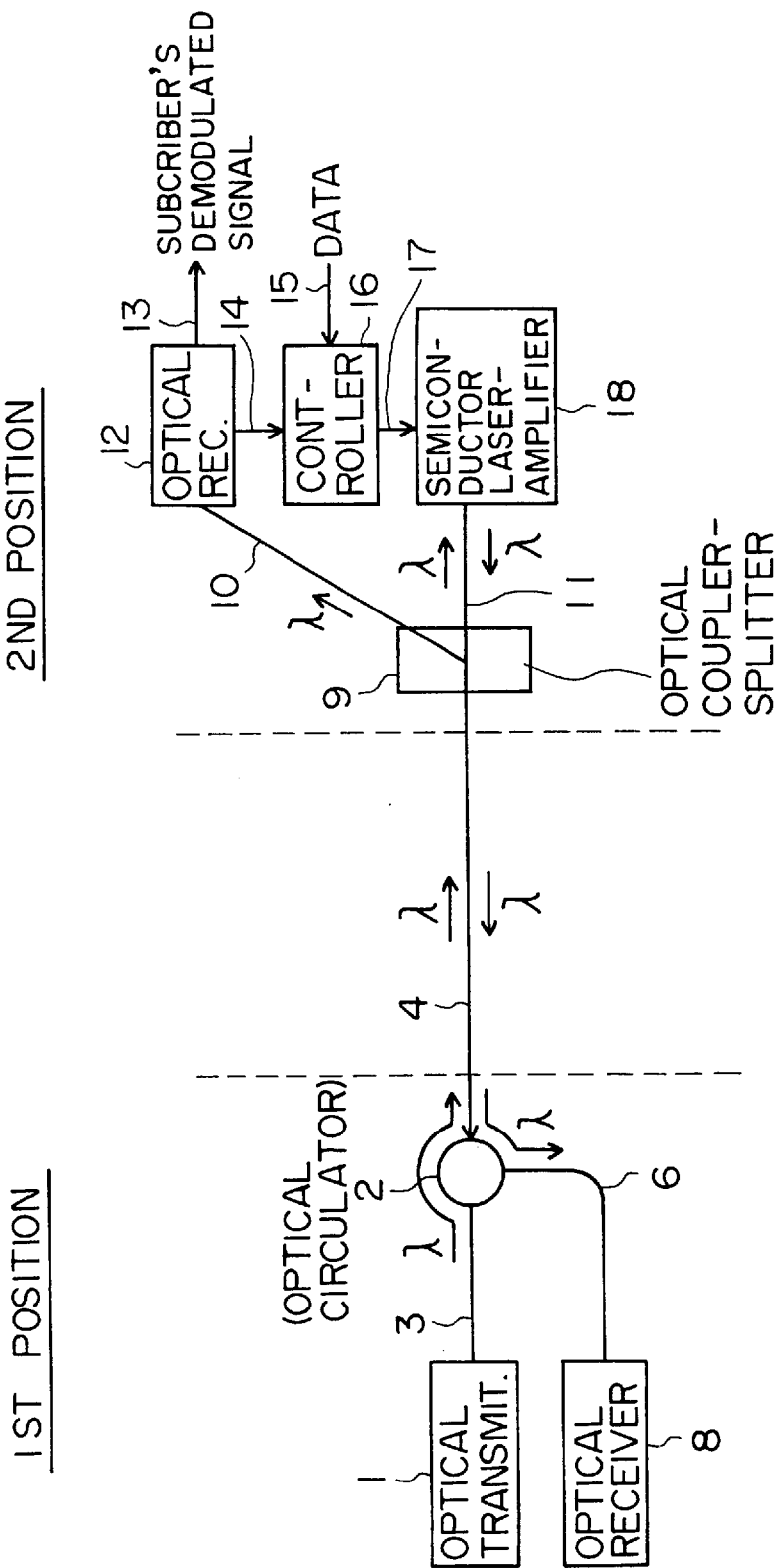
FIG. 1 is a block diagram illustrating the structure of an embodiment of the present invention.

With reference to FIG. 1 illustrating a block diagram of an embodiment of the present invention, reference numeral 1 denotes an optical transmitter for generating a down-link optical signal of the wavelength at a first position (a central office), 2 an optical circulator, 3 an optical fiber, 4 an optical fiber connecting the first position (the central office) and a second position (a subscriber's station), 6 an optical fiber, 8 an optical receiver for the up-link optical signal, 9 an optical coupler-splitter at the second position (the subscriber's station), 10 and 11 optical fibers, 12 an optical receiver for receiving a part of the down-link optical signal split by the optical coupler-splitter 9, 13 a demodulated down-link message, 14 clock pulses for the up-link signal extracted from the down-link signal, 15 up-link message data, 16 an optical amplifier controller for controlling a semiconductor laser-amplifier 18 in synchronization with the clock pulses 14 in accordance with the up-link message data 15, and 17 the output from the control circuit.

Figure 2:
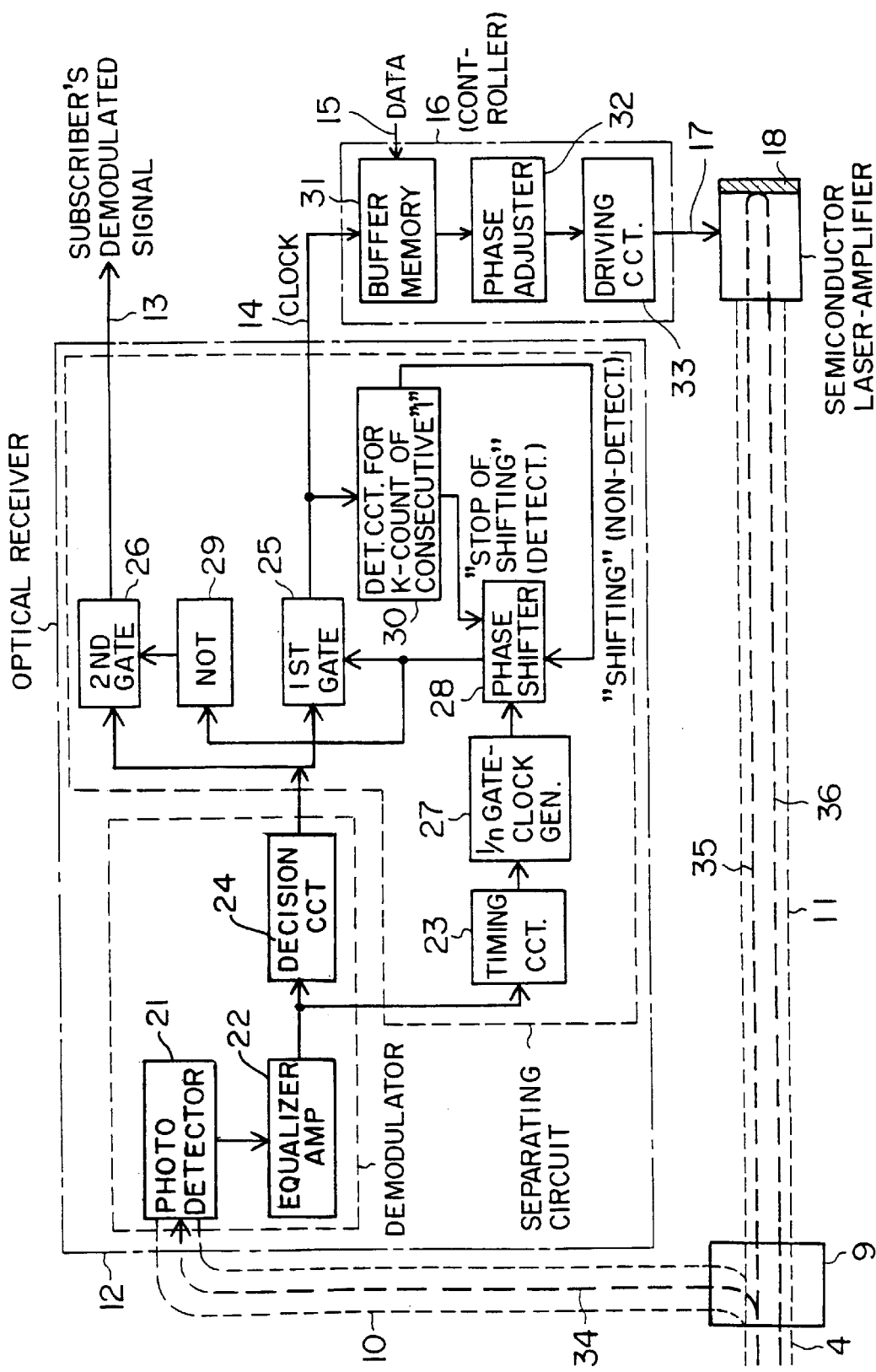
FIG. 2 is a block diagram showing examples of the structure of an optical receiver 12 and an optical controller 16 for use in the present invention.

FIG. 2 illustrates in block form the optical receiver 12 and the controller 16. In the optical receiver 12, reference numeral 21 denotes a photodetector, 22 an equalizer amplifier, 23 a timing circuit, 24 a decision circuit, 25 a first gate circuit, 26 a second gate circuit, 27 a 1/n gate-clock generator, 28 a phase shifter, 29 a NOT circuit, and 30 a detection circuit for K-count of consecutive "1". In the controller 16, reference numeral 31 denotes a buffer memory, 32 a phase adjuster, and 33 a pumping circuit for pumping the semiconductor laser-amplifier. Reference numeral 34 a part of the down-link optical signal split by the optical coupler-splitter 9, 35 the remainder of the down-link optical signal split by the optical coupler-splitter 9, and 36 an up-link optical signal generated by the semiconductor laser-amplifier 18.

Figure 3:
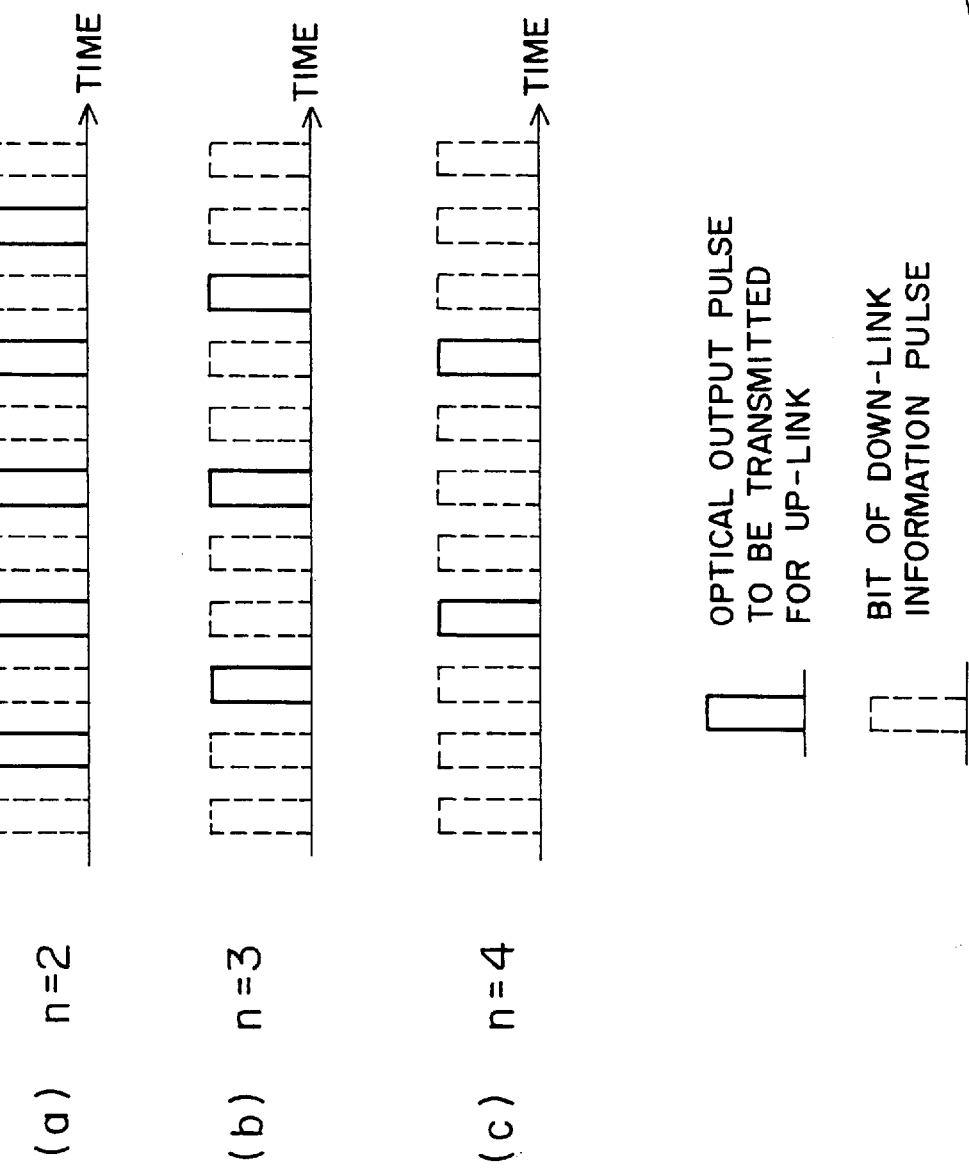
FIG. 3 is a diagram showing examples of the configuration of a down-link optical signal for use in the present invention.

A description will be given, with reference to FIGS. 1 and 2, of the operation of this invention system. Assume, for example, that the data rate of the down-link message is 600 Mb/s and the data rate of the up-link message also 600 Mb/s. The transmission rate, p bits/s, of the down-link optical signal, which is generated by the optical transmitter 1 placed in the central office, is p=1200 Mb/s and an optical pulse for the up-link message always exists every other bits as shown by a train (a) in FIG. 3. In this instance, n=2. Digital signals of the down-link message (indicated by the broken lines) and optical pulses (indicated by the solid lines) for carrying the up-link message alternate with each other. The solid-lines pulses always remain at the "1" level, whereas the broken-lined pulses go to the "1" or "0" level according to the down-link message data. When the transmission rate of the up-link signal need not be as high as 600 Mb/s, it can be reduced down to 400 Mb/s by setting n=3 as shown by a train (b) in FIG. 3 and to 300 Mb/s by setting n=4 ((c)in FIG. 3). When the semiconductor laser-amplifier 18 placed in the subscriber's station at the second position is driven, the optical pulses for the up-link are amplified up to the "1" level and when it is not driven, they are attenuated down to the "0" level. By turning ON and OFF the amplifier according to the up-link message data, the up-link optical signal is generated by the optical amplifier. This will be described in detail later on.

The down-link optical signal from the optical transmitter 1 is transmitted over the optical fiber 4 to the subscriber's station at the second position via the optical circulator 2. A part of the down-link optical signal is transmitted over the optical fiber 10 via the optical coupler-splitter 9 at the second position to the optical receiver 12, wherein it is converted by the photodetector 21 to an electric signal. The electric signal is equalized and amplified by the equalizer-amplifier 22, after which a part of its output is input into the timing circuit 23 and the remainder the decision circuit 24. The input into the decision circuit 24 is decided at the timing set by the timing circuit 23, and the output from the decision circuit 24 is distributed to the first and second gate circuits 25 and 26.

Figure 4:
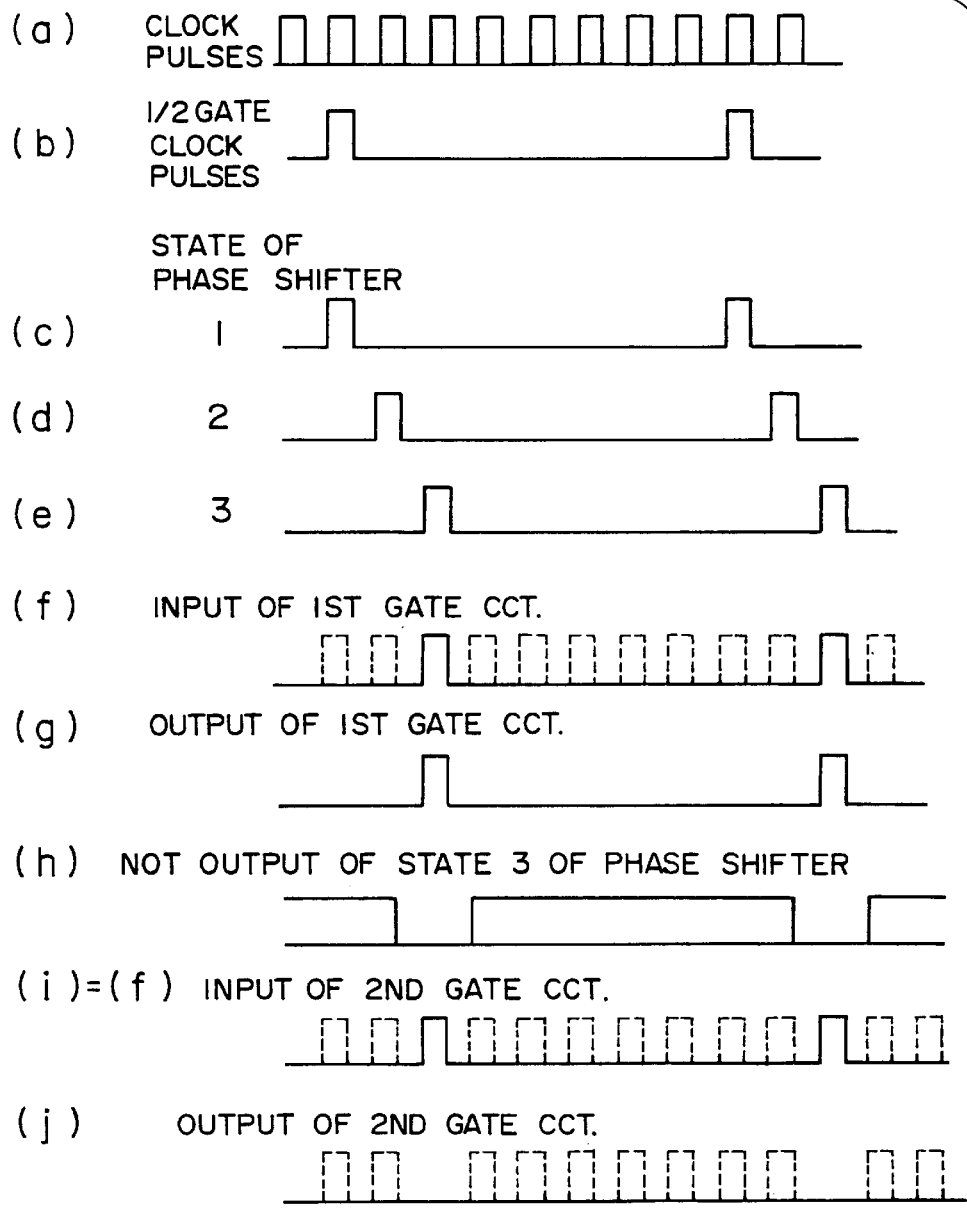
FIG. 4 is a timing chart explanatory of an operation for detecting a clock pulse for an up-link optical signal from the down-link optical signal.

The 1/n gate-clock generator 27 generates 1/n gate-clock pulses ((b) in FIG. 4) from the output of the timing circuit 23 ((a)in FIG. 4). The 1/n gate-clock pulses are shifted by the phase shifter 28 on a bitwise basis as shown by (c), (d) and (e) in FIGS. 4 each time the detection circuit 30 enters its non-detecting state. Provided that the input signal to the first gate circuit 25 and the output from the phase shifter 28 are such as shown by (f) and (e), respectively, in FIG. 4, the output from the first gate circuit 25 becomes such as depicted by (g) in FIG. 4. The detection circuit 30 counts "1" outputs from the first gate circuit 25. When having counted K outputs, the detection circuit 30 decides that the phase of the 1/n gate-clock pulse at this timing is a clock pulse for the up-link signal and stops the phase shifter from its shifting operation. That is, while the detection circuit 30 is in the non-detecting state, the phase shifter 28 shifts the clock generator output by one bit and remains unchanged over K clocks, thereafter shifting the clock generator output again. The same operations are repeated upon each counting of K outputs "1" of the first gate circuit 25. The 1/n gate-clock pulses 14 are input into the buffer memory 31 of the controller 16. The up-link message data 15 read by this clock into the buffer memory 31 is sent to the phase adjuster 32.

The phase adjuster 32 is a circuit for finely adjusting the phase relationship between the clock pulses for up-link information and the optical pulses 35 for up-link optical signal which are provided to the semiconductor laser-amplifier 18. Based on the output from the phase adjuster 32, the driving or pumping circuit 33 applies driving or pumping current pulses to the semiconductor laser-amplifier 18.

When the phase shifter 28 is in the state (e) of FIG. 4 (in the state of synchronization), the NOT circuit 29 generates such an output as shown by (h) in FIG. 4 and the output from the second gate circuit 26, which is produced by the gate operation with the NOT output and the input to the second gate circuit 26 (FIG. 4(i)=(f)), becomes such as shown by (j) in FIG. 4, which is used as the subscriber's demodulated signal 13.

From the functional point of view, the above operation is to correctly separate the down-link and up-link optical signals, i.e. synchronize their phases, by detecting K consecutive "1s" while shifting the 1/n gate-clock pulses by the phase shifter 28. The value K corresponds to the time interval to the establishment of synchronization and may preferably be small. With too small a value K, however, the probability of failure in synchronization increases due to consecutive "1s" in the down-link optical signal. In practice, the value K is set approximately in the range of 8 to 32.

In the period prior to the establishment of synchronization, signals in which the down-link and up-link signals are not accurately separated are sent to the subscriber and the central office. Since these signals become frame-out-of-synchronization in the transmission mode of the optical access system, for instance, in a synchronous transmission mode (STM) or asynchronous transmission mode (ATM), they indicates that the optical access system is in the process of establishing synchronization. To explicitly indicate that the system is in the process of establishing synchronization, it is also possible to make the down-link signal a "1" consecutive signal and hold OFF the optical pulses for the up-link signal while the phase shifter is in the non-detecting state. This process for the establishment of synchronization is automatically performed. For example, when a transmission error or short break occurs on a fiber, the detection circuit 30 enters the non-detecting state and the phase shifter 28 starts the shift operation. Upon recovery from the error, the synchronization is established. In other words, the circuit of the present invention can automatically detect and recover from errors.

While the above description has been given on the assumption that the bandwidth ratio of the down-link signal to the up-link signal is 1:1/n, this ratio could easily be reversed by exchanging the phase shifter 28 and the NOT circuit 29 in FIG. 2. In ordinary subscribers, the down-link bandwidth is wider than the up-link one due to services such as the distribution of TV signals or the like. If the TV station is a subscriber, however, the down-link bandwidth is narrower than the up-link one. It depends on the type of subscriber traffic service which link is assigned the 1/n bandwidth and what value is set as n, and they are determined at the stage of a subscription contract. With the present invention, it is possible to meet subscribers' requirements for various kinds of services.

The advantages referred to above are particularly effective when using the asynchronous transmission mode (ATM). Let it be assumed, for example, that the transmission rate of the up-link signal is set at 600 Mb/s so as to achieve the maximum traffic from the subscriber. The traffic from the subscriber's station varies every moment, but the traffic speed or transmission rate can freely be determined by the use of the ATM scheme (e.g.:45 Mb/s for TV communication and 30 Mb/s for inter-LAN communication), because the ATM scheme allows ease in speed matching by transmitting empty cells when the transmission rate does not reach a transmission rate of 600 Mb/s. When the maximum traffic exceeds a transmission rate of 600 Mb/s, the value n will be changed. This can easily be dealt with by modifying the subscription contract and associated parameters of the access system.

Figure 5:
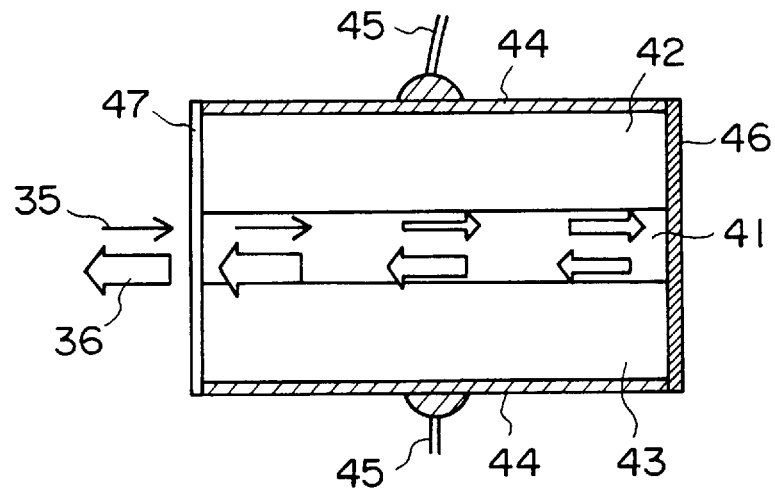
FIG. 5 is a sectional view schematically illustrating an example of the construction of a semiconductor laser amplifier for use in the present invention and explanatory of its operation.
Figure 6:
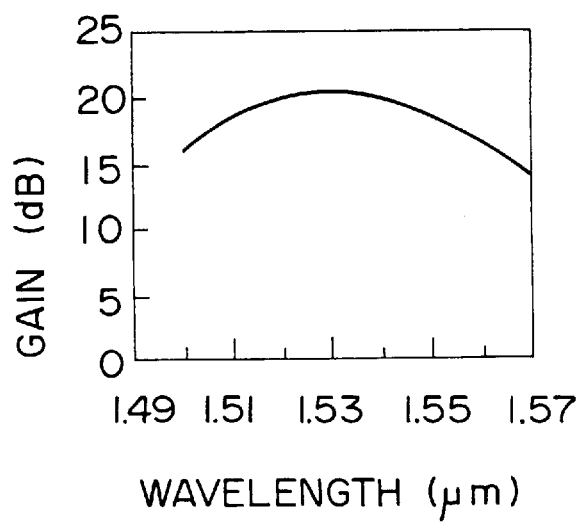
FIG. 6 is a graph showing the relationship of the wavelength to the gain of the semiconductor laser amplifier for use in the present invention.

FIG. 5 is a schematic sectional view of the semiconductor laser-amplifier 18. Reference numeral 41 denotes an active layer, 42 a p-type clad layer, 43 an n-type clad layer, 44 each of electrodes, 45 each of lead wires to the electrodes, 46 a total reflection film and 47 an anti-reflection film. In FIG. 6 there is shown the wavelength dependency of the gain of the semiconductor laser-amplifier. The half width at half maximum of the gain is approximately 60 nm. The peak gain of the semiconductor laser-amplifier undergoes a temperature change of 0.5 nm/°C. Even if a temperature changes by 50° C. in the subscriber's station, the wavelength of the peak gain fluctuates only 25 nm. Since the gain variation by this temperature change can be accommodated into the system margin, there is no need of controlling the oscillation wavelength of the semiconductor laser in response to temperature variations. This is one of the reasons for which the semiconductor laser-amplifier is used in the subscriber's station.

Figure 7:
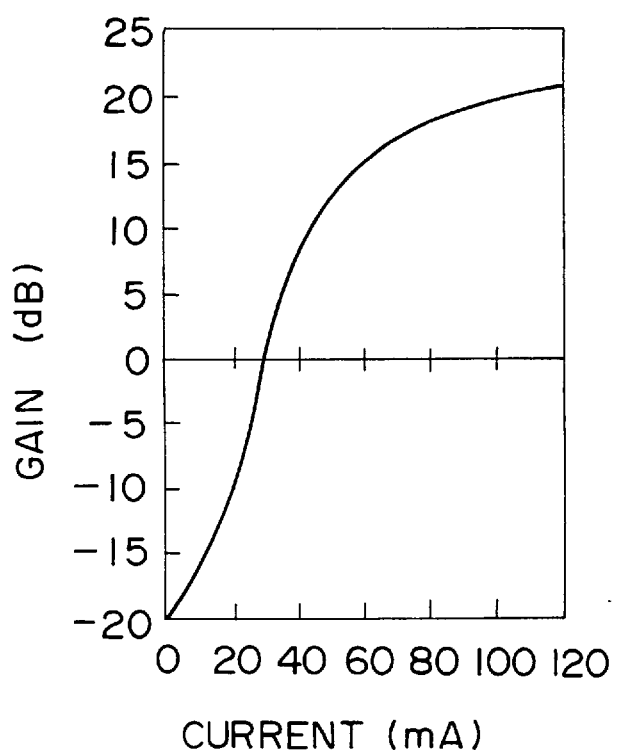
FIG. 7 is a graph showing the driving current vs. gain characteristic of the semiconductor laser amplifier for use in the present invention.
Figure 8:
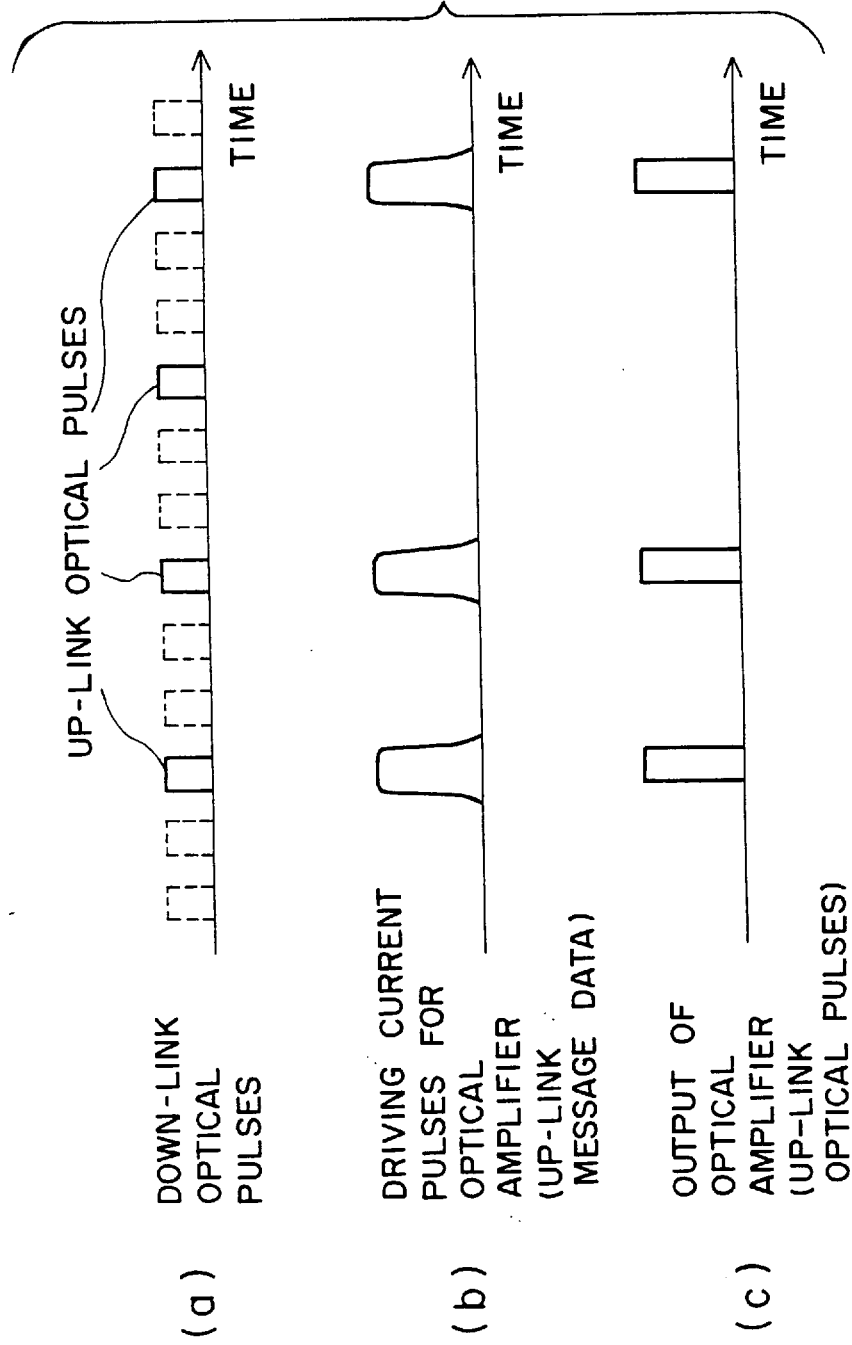
FIG. 8 is a graph showing the relationships among down-link optical pulses incident on the semiconductor laser amplifier, driving current pulses for an optical amplifier and an optical amplifier output serving as up-link optical pulses.

FIG. 7 shows an example of a change in the gain between the input optical fiber and the output optical fiber with respect to the semiconductor laser-amplifier pumping current. In this instance, the semiconductor laser-amplifier operates as an amplifier on a pumping current above 30 mA and as an attenuator on a current below 30 mA. As shown in FIG. 8, when the up-link information has a state "1," pumping current pulses above 30 mA (FIG. 8(b)) are applied to the optical amplifier 18, by which up-link optical pulses (indicated by the full lines) selected from the down-link optical signal 35 (FIG. 8(a)) launched thereinto are amplified. The thus amplified optical pulses are reflected by the total reflection film 46 again to pass the active layer 41 and amplified, thereafter being emitted through an incident facet having the anti-reflection film. As a result, such up-link optical pulses 36 as shown in FIG. 8(c) are obtained from the optical amplifier 18. The semiconductor laser-amplifier has a response speed of several gigahertz. In contrast to this, an erbium-doped optical fiber laser amplifier has a response speed on the order of kilohertz. Another reason for the use of the semiconductor laser amplifier is its fast response property.

Figure 9:
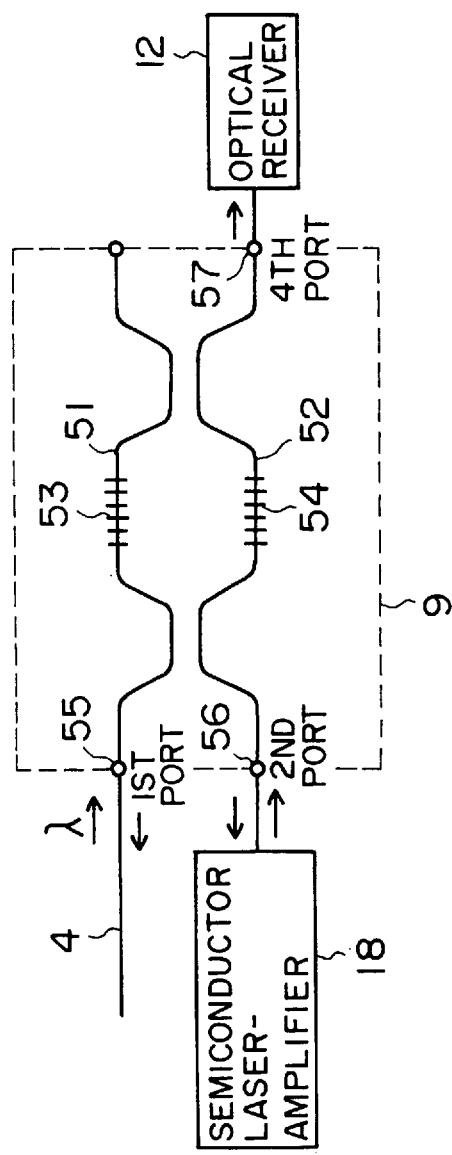
FIG. 9 is a diagram illustrating, by way of example, the constructions of optical coupler-splitters 71, 74 and 77 for use in the present invention.

The up-link optical pulses are sent over the optical fiber 4 to the first position via the optical coupler-splitter 9. The optical coupler-splitter 9 has such a construction as shown in FIG. 9, in which gratings 53 and 54 each having a certain reflectivity R with respect to the wavelength A are formed on two arms 51 and 52 of an optical waveguide type Mach-Zehender interferometer. When supplied with the down-link optical pulses at its first port 55, the optical coupler-splitter 9 provides output pulses at the rate of 1–R of the down-link optical pulses to a fourth port 57, from which the output pulses are fed to the optical receiver 12. From a second port 56 the output power provided at the rate of R of the down-link optical pulses is emitted for incidence to a semiconductor laser amplifier 18. The power of the amplified optical pulses is reduced down to the rate of R and is incident to the optical fiber 4 via the first port 55. The optical coupler-splitter 9 serves also as an optical filter and cuts off light which is spontaneously emitted as noise from the semiconductor laser amplifier 18. The up-link optical pulses transmitted over the optical fiber 4 are separated by the circulator 2 from the down-link optical pulses at the first position (in the central office), where they are sent over the optical fiber 6 to the optical receiver for demodulation.

Figure 10:
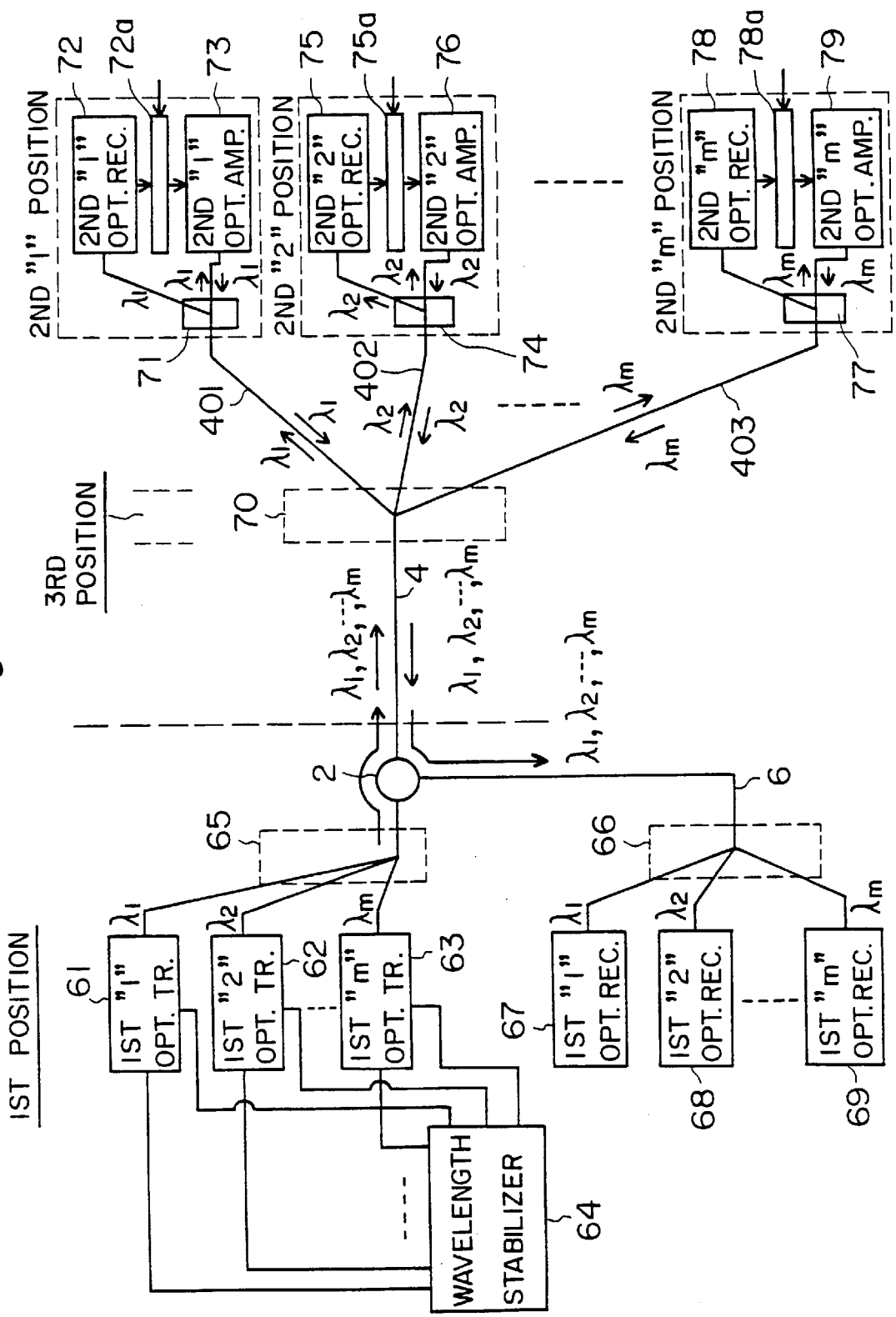
FIG. 10 is a block diagram illustrating an example of the structure of another embodiment of the present invention.

FIG. 10 illustrates in block form an embodiment of the present invention in case of wavelength multiplexing. Reference numeral 61 denotes a first-i optical transmitter which generates an optical signal of a wavelength $\lambda_1$, 62 a first-2 optical transmitter which generates an optical signal of a wavelength $\lambda_2$, 63 a first-m optical transmitter which generates an optical signal of a wavelength $\lambda_m$, 64 a wavelength stabilizer for stabilizing the wavelength of the light source for the optical transmitters, 65 a first optical coupler-splitter for coupling down-link optical signals of wavelengths $\lambda_1$ to $\lambda_m$, 66 a second optical coupler-splitter for splitting up-link optical signals of the wavelengths $\lambda_1$ to $\lambda_m$, 67 a first-1 optical receiver which receives an up-link optical signal of the wavelength $\lambda_1$, 68 a first-2 optical receiver which receives the up-link optical signal of the wavelength $\lambda_2$, 69 a first-m optical receiver which receives the up-link optical signal of the wavelength $\lambda_m$, 70 a third optical coupler-splitter placed at a third position which is a PDS node, 401 a second-1 transmission line from the third optical coupler-splitter 70 to a subscriber at a second-1 position, 402 a second-2 transmission line to a subscriber at a second-2 position, 403 a second-m transmission line to a subscriber at a second-m position, 71 a second-1 optical coupler-splitter in the subscriber's station at the second-1 position, 72 a second-1 optical receiver, 72a a second-1 control circuit, 73 a second-1 semiconductor laser amplifier, 74 a second-2 optical coupler-splitter in the subscriber's station at the second-2 position, 75 a second-2 optical receiver, 75a a second-2 control circuit, 76 a second-2 semiconductor laser amplifier, 77 a second-m optical coupler-splitter in the subscriber's station at the second-m position, 78 a second-m optical receiver, 78a a second-m control circuit, and 79 a second-m semiconductor laser amplifier.

Referring to FIG. 10, the operation of the present invention will be described. Optical signals or pulses of m wavelengths emitted from the first-i optical transmitter 61 to the first-m optical transmitter 63 are coupled by the first coupler-splitter 65, from which the coupled optical signal is provided via the optical circulator 2 to the optical fiber 4. The wavelength-multiplexed down-link optical signal is split by the third optical coupler-splitter 70 placed at the third position which is a PDS node, from which the optical signals of the wavelengths $\lambda_1$ to $\lambda_m$ are sent to the subscribers at the second-1 to second-m positions, respectively. The down-link optical signals are partly split by the optical coupler-splitters 71, 74 and 77 and the split optical signals are each demodulated by one of the optical receivers 72, 75 and 78. The remaining down-link optical signals are fed to the semiconductor laser amplifiers 73, 76 and 79, at which they are controlled by the control circuits 72a, 75a and 78a as described previously with reference to FIGS. 1 and 2 to form up-link optical signals, which are retransmitted over the transmission line back to the third position as described previously with reference to FIGS. 1 and 2. The up-link optical signals thus formed in the respective subscribers' stations are coupled by the optical coupler-splitter 70 in the node into a composite optical signal, which is sent over the optical fiber 4 to the central office at the first position. The wavelength-multiplexed up-link optical signals are separated by the optical circulator 2 from the down-link optical signal and is split by the second optical coupler-splitter 66 into optical signals of the wavelengths $\lambda_1$ to $\lambda_m$ which are demodulated by the first-i to first-m optical receivers 67, 68, . . . 69.

Figure 11:
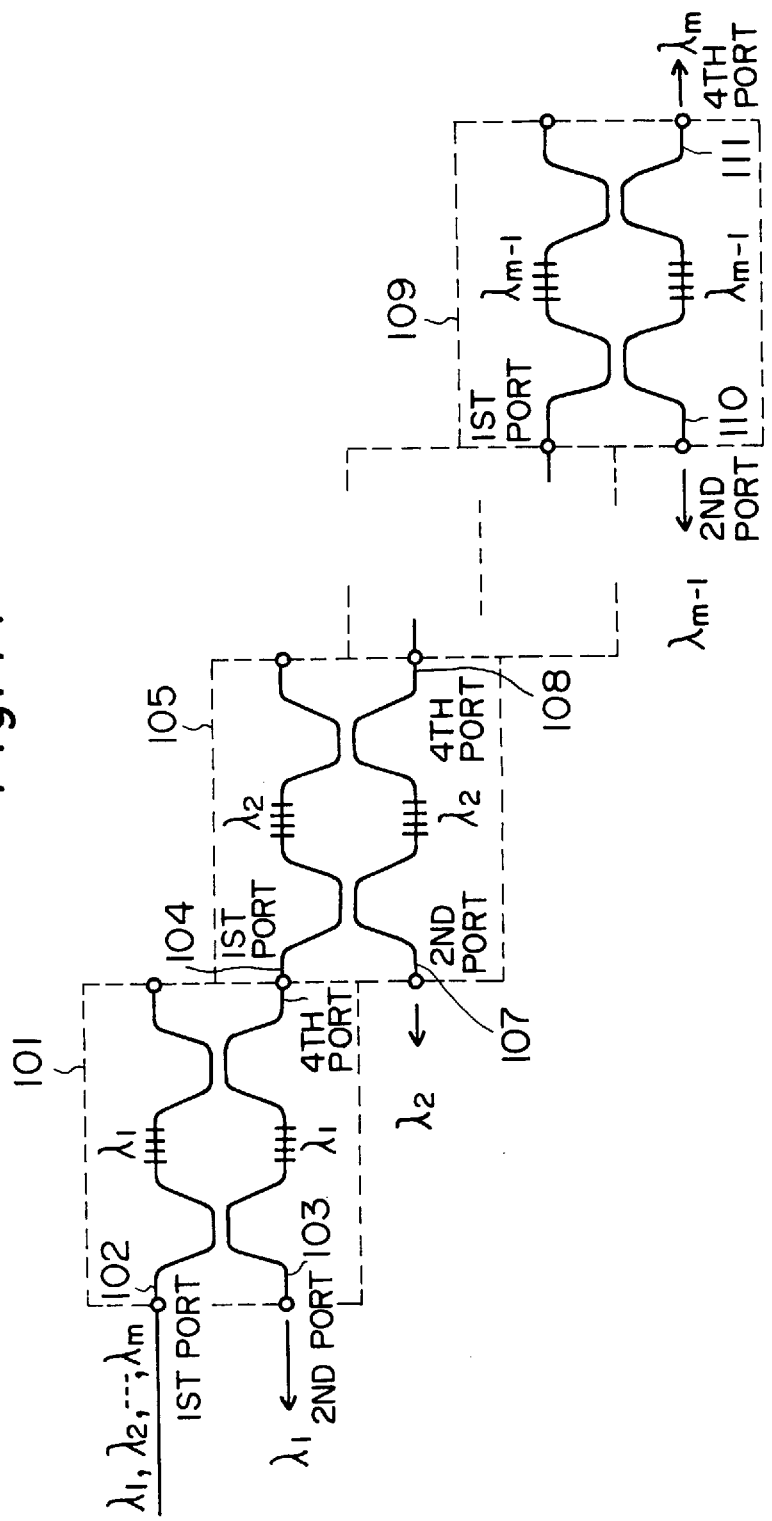
FIG. 11 is a diagram showing, by way of example, the constructions of optical coupler-splitter 65, 66 and 70 for use in the present invention.
Figure 12:
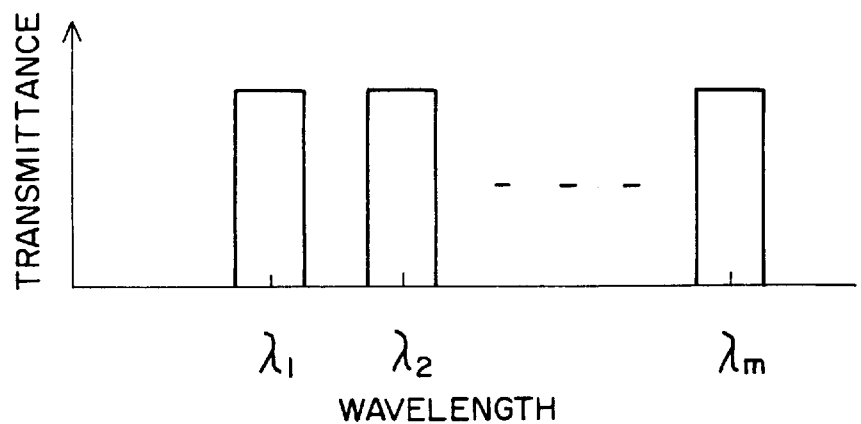
FIG. 12 is a graph showing the wavelength characteristic of the transmittance of each optical coupler-splitter depicted in FIG. 11.

FIG. 11 illustrates concrete examples of the optical coupler-splitters 65, 66 and 70, which are formed by a cascade connection of Mach-Zehender interferometer type optical coupler-splitters, each having diffraction gratings using one of $\lambda_1$ to $\lambda_{m-1}$ the Bragg wavelength and formed on two arms, respectively, as described previously in respect of FIG. 9. An optical signal obtained by wavelength-multiplexing m waves of wavelength $\lambda_1$ to $\lambda_m$ enters a first port 102 of an optical coupler-splitter 101, which emits the optical signal of the wavelength $\lambda_1$ from a second port 103 and the other remaining optical signals of the wavelengths $\lambda_2$ to $\lambda_m$ from a fourth port 104. The fourth port 104 is connected to a first port of the next-stage optical coupler-splitter 105, which emits the optical signal of the wavelength $\lambda_2$ from a second port 107 and the other remaining optical signals of the wavelengths $\lambda_3$ to $\lambda_m$ from a fourth port 108. The following optical coupler-splitters each performs these operations; an optical coupler-splitter 109 of the final-stage emits light of the wavelength $\lambda_{m-1}$ from its second port 110 and light of the wavelength $\lambda_m$ from its fourth port 111. The wavelength characteristic of the transmittance of the optical coupler-splitter in FIG. 11 is shown in FIG. 12. It is desirable that the shape of the wavelength characteristic of the transmittance be rectangular so that the transmittance remains unchanged even if the wavelength of the light source or the transmission center wavelength of the optical coupler-splitter somewhat varies.

In a case of the up-link signal from each subscriber to the central office, the optical signal of wavelength $\lambda_1$ from the second-1 position enters the second port 103, the optical signal 2 from the second-2 position enters the second port 107 and the optical signal of wavelength $\lambda_m$ from the second-m position enters the fourth port 111; these optical signals are emitted as a multiplexed signal from the first port 102.

Figure 13:
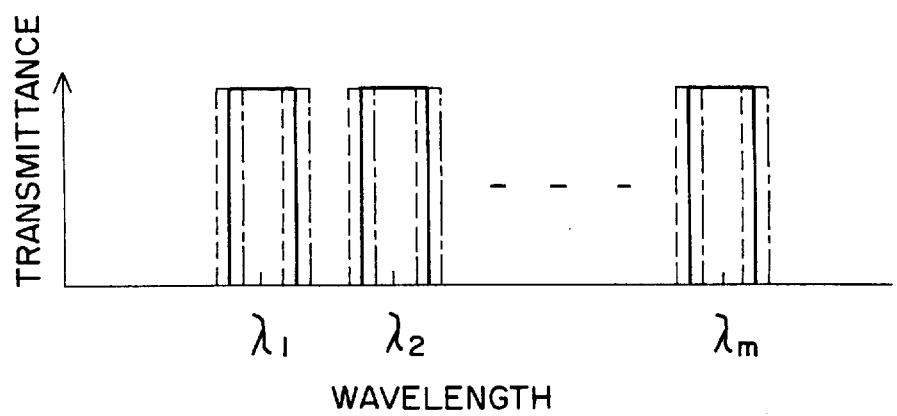
FIG. 13 is a graph showing one upon another the transmittance-wavelength characteristics of the optical coupler-splitters 65, 66 and 70.

The optical signals sent from the optical transmitters 61 to 63 placed at the first position (in the central office) are received by the optical receivers 67 to 69 after passing through a total of three optical coupler-splitters, that is, the first optical coupler-splitter 65 at the first position, the third optical coupler-splitter 70 in the node at the third position and the second optical coupler-splitter 66 at the first position. Properly speaking, the optical signals pass through the optical coupler-splitter in the subscriber's station, but this is ignored since the passing bandwidth of this optical coupler-splitter can be made wider than the passing bandwidths of the above-mentioned three optical coupler-splitters. In FIG. 13 there are shown, in a mutually overlapping manner, transmittance-wavelength characteristics of the three optical coupler-splitters, with their transmission center wavelengths slightly shifted. The overlapping portions of the characteristics of the three optical coupler-splitters are the passing bandwidths of the network in its entirety. It is necessary that the wavelengths of the optical transmitters at the first position fall within the overlapping zones of wavelengths. This calls for wavelength stabilization of the optical transmitters.

Figure 14:
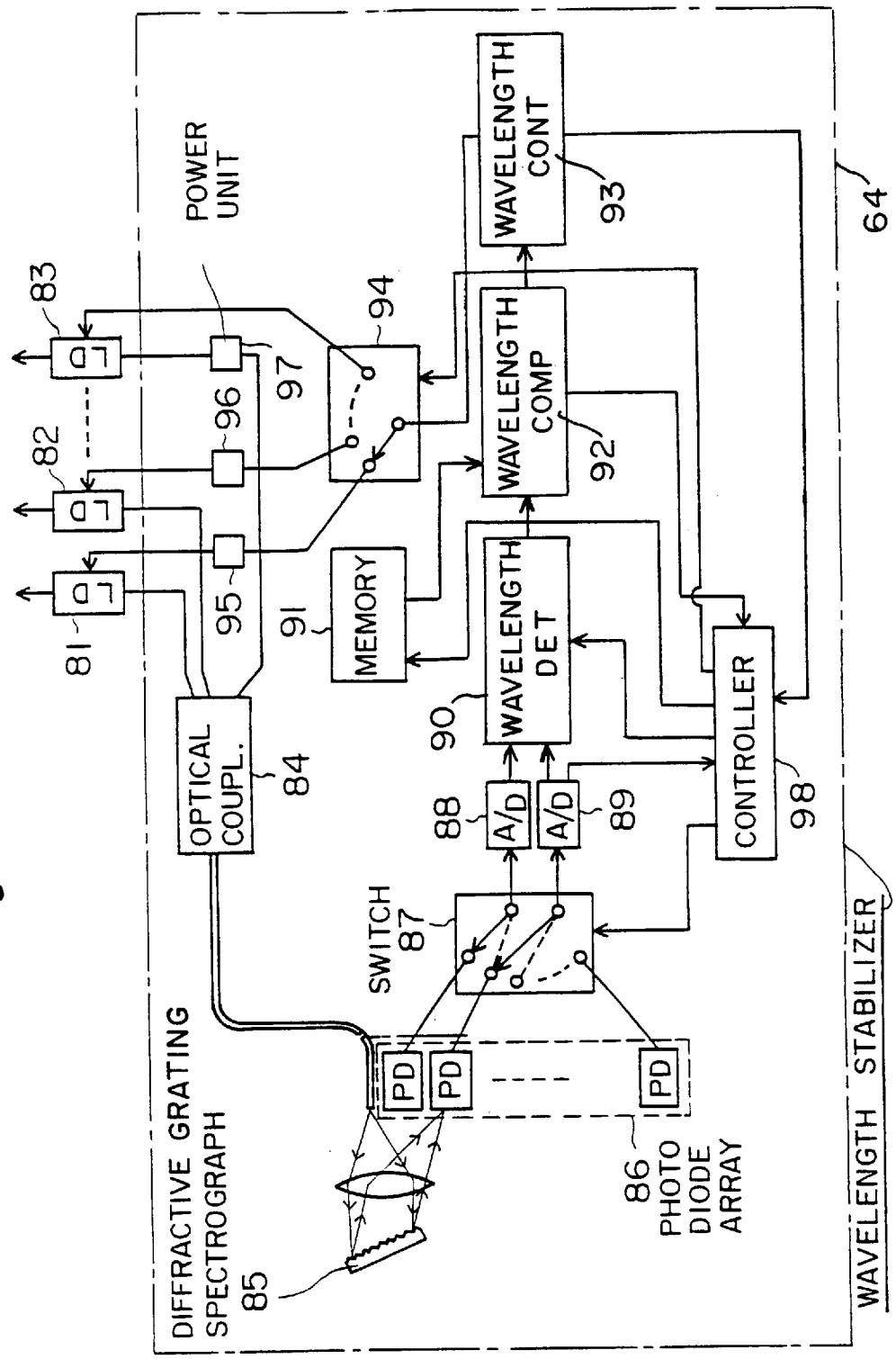
FIG. 14 is a block diagram of a wavelength stabilizer 64 for use in the present invention.
Figure 15:
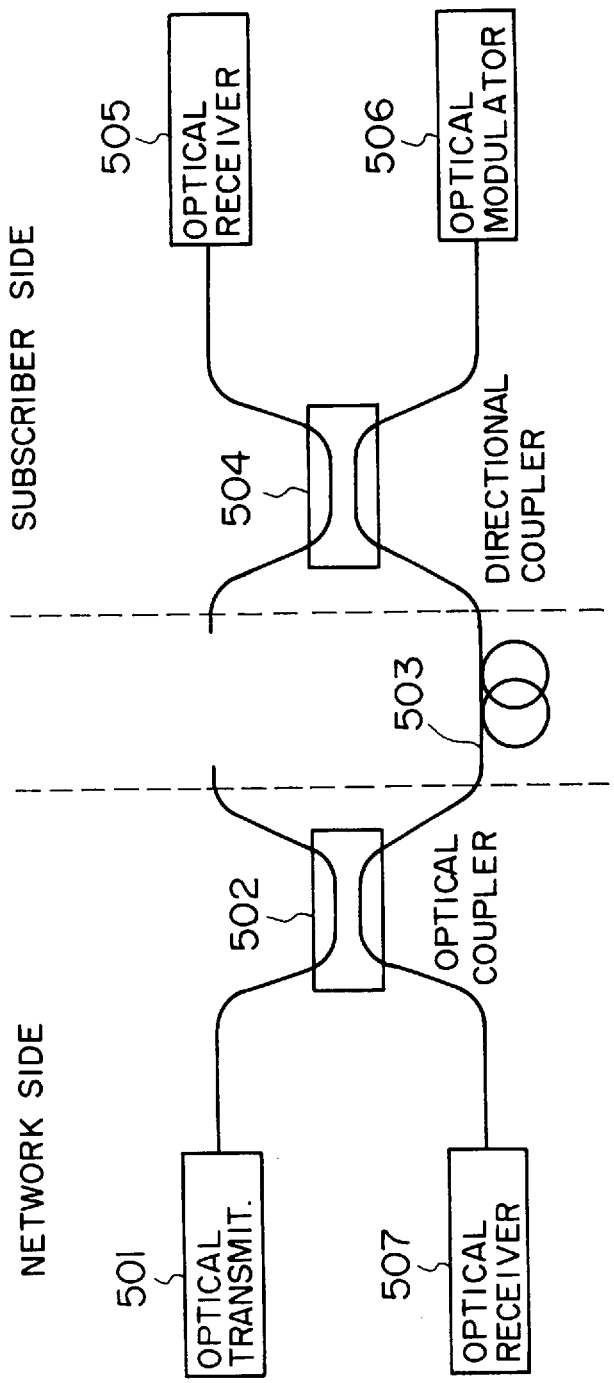
FIG. 15 is a block diagram showing an example of a conventional bilateral fiber optic transmission system.

FIG. 14 illustrates in block form the wavelength stabilizer 64. A Japanese patent application has already been filed on this device (see Japanese Pat. Appln. No. 303395/95 entitled "Wavelength Stabilizer"). The outputs from semiconductor lasers 81 to 83 of the optical transmitters 61 to 63 are coupled together by an optical coupler 84 into a composite optical signal, which is reflected and diffracted by a diffracting grating spectrograph 85 to be split onto a photo diode array 86. Each of the photo diodes corresponds to one of the wavelengths used; hence, the wavelength of light can be known from the photo diode from which the light was emitted. A first switch 87 scans the outputs of the photo diodes to specify the photo diode irradiated by light. The output from such a light-irradiated photo diode is converted by either one of AD converters 88 and 89 to a digital signal, on which a wavelength detector 90 performs a logic operation to detect its wavelength. An originally required standard wavelength is read out of a memory 91 for standard wavelength information, then the read-out wavelength and the detected one are compared with each other by a wavelength comparator 92, and a control signal corresponding to a difference between them is fed from a wavelength controller 93 to a second switch 94. Responsive to a signal from a controller 98, the second switch 94 is switched to a terminal to that one of the semiconductor lasers which is to be controlled, and the control signal is fed to that one of power units 95 to 96 which generates a sourse current or voltage for controlling the output wavelength of the specified semiconductor laser. When the semiconductor lasers 81 to 83 are tunable lasers of the type that their output wavelength is controlled by a current injection thereinto, the current is generated in each of the power units 95 to 97, whereas when the output wavelengths of the semiconductor lasers 81 to 83 are controlled by temperature through the use of Peltier elements, the power units 95 to 97 generate currents for application to the Peltier elements. The temperature characteristic of the spectrograph of the type using diffraction gratings is 0.0005 nm/C, and even if a temperature in the subscriber's station varies by 50° C., the wavelength fluctuation will be limited in a range of only ±0.01 nm.

The use of the wavelength multiplexing system inevitably involves many optical coupler-splitters in the network. Though different according to its structure and the number of waves to be split, a single optical coupler-splitter normally produces an insertion loss of 5 dB or more; accordingly, the total insertion loss by the three optical coupler-splitters is in excess of 15 dB. In the optical access system, the distance from the central office to the subscriber is around 10 km and 20 km for both ways. The optical amplifier, which is placed in the subscriber's station with a view to compensating for the loss by the transmission line and losses by respective coupling between devices and optical fibers, is particularly significant when the wavelength multiplexing system is employed. Functionally, an optical modulator can also be used in place of the optical amplifier.

While in the above the present invention has been described as being applied mainly to the transmission of optical pulse information over the bilateral optical transmission line, the invention is also applicable to the transmission of pulse information such as an electric signal which uses other wired and radio bilateral transmission systems.

As described above in detail, the system of the present invention possesses the merits listed below.

(1) In response to a particular request, the message or information speed can be set within the range of the maximum value which is a combination of the message speed of an up-link signal and the message speed of a down-link signal; this well matches with the ATM system, too.

(2) Since a semiconductor laser amplifier of a large full width at half maximum is placed in the subscriber's station, there is no need of effecting control like wavelength stabilization of the semiconductor laser.

(3) The optical access network using the wavelength multiplexing system inevitably involves the use of several optical coupler-splitters. The optical amplifier placed in the subscriber's station is effective in compensating for their insertion losses and in securing the operating margin of the system.

(4) In each PDS network the transmission lines from the central office to the node and from the node to the subscriber's station are each formed by one optical fiber to make the system economical.

(5) A mechanism is provided which permits automatic detection of and recovery from a transmission failure on the PDS network.

(6) The wavelength control of the network is effected on the part of the central office alone, and hence the PDS node and the subscriber side can be made maintenance-free.

(7) Both communication and broadcasting services can be offered on the same optical network, and hence multimedia services can be dealt with.

(8) With these advantages, it is possible to provide an economical subscriber terminal and an economical, stable and easy-to-maintain optical access system.

What we claim is:

1. A bilateral optical transmission system for pulse information comprising:

a single bilateral optical transmission line laid between first and second positions;

pulse generation means provided at said first position and connected to the single bilateral optical transmission line for transmitting a transmission pulse train with pulse transmission time slots set therein at fixed time intervals onto said transmission line from said first position;

pulse retransmitting means provided at said second position and connected to the single bilateral optical transmission line for automatically retransmitting a return pulse train from said second position to said first position over said bilateral optical transmission line, said return pulse train being obtained by gating by an optical gate circuit said transmission pulse train on the basis of up-link information pulses from said second position to said first position in synchronization with up-link pulse transmission time slots for the transmission of said up-link information pulses so that at least one predetermined transmission time slot in each unit transmission period defined by a predetermined number of pulse periods in said transmission pulse train is used as said up-link pulse transmission time slot;

pulse receiving means provided at said first position for receiving said up-link pulse transmission time slots; and pulse transmission means provided at said first position, for transmitting at least one time slot other than said up-link optical pulse transmission time slot in each said unit transmission period used as at least one down-link optical pulse transmission time slot for transmitting each of down-link information pulses from said first position to said second position.

2. A bilateral optical transmission system for pulse information according to claim 1, in which said transmission line is a single optical fiber transmission line.

3. A bilateral optical transmission system for pulse information, comprising:

a single bilateral optical transmission line laid between first and second positions;

pulse generation means provided at said first position and connected to the single bilateral optical transmission line for generating a transmission pulse train, which has set therein pulse transmission time slots at predetermined time intervals, from said first position onto said bilateral optical transmission line, said transmission pulse train being set so that at least one predetermined transmission time slot in each unit transmission period defined by a predetermined number of pulse periods in said transmission pulse train is used as an up-link pulse transmission time slot for the transmission of each up-link information pulse from said second position to said first position;

pulse retransmitting means provided at said second point and connected to the single bilateral optical transmission line for receiving said transmission pulse train and for automatically retransmitting a return pulse train, which is obtained by gating by an optical gate circuit said transmission pulse train on the basis of said up-link information pulses in synchronization with said up-link pulse transmission time slot, to said first position over said bilateral optical transmission line; and pulse receiving means provided at said first point for receiving said return transmission pulse train from said bilateral optical transmission line to extract said up-link information pulses from said received return transmission pulse train.

4. An optical transceiver used in a bilateral optical transmission system for pulse information wherein:

a transmission pulse train with optical pulse transmission time slots set therein at fixed time intervals is transmitted from a first position to a second position over a single transmission line laid therebetween;

at least one predetermined transmission time slot in each unit transmission periods defined by a predetermined number of pulse periods in said optical pulse transmission time slots is used as an up-link optical pulse transmission time slot for transmitting up-link information pulses from said second position to said first position; and at least one time slot other than said up-link optical pulse transmission time slot in said each unit transmission period is used as at least one down-link optical pulse transmission time slot for transmitting down-link information pulses from said first position to said second position;

said optical transceiver placed at said second position, comprising:

an optical coupler-splitter connected to said bilateral optical transmission line;

an optical receiver for extracting said down-link information pulses demodulated from optical pulses split by said optical coupler-splitter from said transmission pulse train and the clock of said up-link pulse transmission time slots other than said down-link pulse transmission time slots on which said down-link information pulses have been transmitted;

an optical gate controller for sequentially inserting said up-link information pulses into said up-link pulse transmission time slots to provide driving current pulses in synchronization with the clock of said up-link pulse transmission time slots;

an optical gate circuit supplied with said optical pulses split by said optical coupler-splitter from said transmission pulse train, for gating said optical pulses by said driving current pulses to provide up-link optical pulses; and sending means for supplying to said optical coupler-splitter the up-link optical pulses obtained at the output of said optical gate circuit so that said up-link optical pulses are coupled onto said optical transmission line through said optical coupler-splitter.

5. A bilateral optical transmission system for pulse information, comprising:

a single bilateral optical transmission line laid between first and second positions;

pulse generation means provided at said first position and connected to the single bilateral optical transmission line for transmitting a plurality of transmission pulse trains each having pulse transmission time slots set therein at fixed time intervals from said first position onto said bilateral optical transmission line while being wavelength-multiplexed at required wavelength intervals;

pulse splitting and retransmitting means provided at said second position and connected to the single bilateral optical transmission line for splitting a plurality of said transmission pulse trains into respective wavelengths and for automatically retransmitting a return pulse train from said second position for each of said wavelengths to said first position over said bilateral optical transmission line, said return pulse train being obtained by gating said transmission pulse trains on the basis of up-link information pulses from said second position to said first position in synchronization with up-link pulse transmission time slots for the transmission of said up-link information pulses so that at least one predetermined transmission time slot in each unit transmission period defined by a predetermined number of pulse periods for each wavelength is used as said up-link pulse transmission time slot;

pulse receiving means provided at said first position for receiving, for each of said wavelengths a plurality of said up-link pulse transmission time slots; and pulse splitting means provided at said first position for splitting said plurality of wavelength-multiplexed transmission pulse trains into respective wavelengths to use the time slots other than said up-link optical pulse transmission time slot in said each unit transmission period in the transmission pulse train for each wavelength as down-link optical pulse transmission time slots for transmitting down-link information pulses from said first position to said second position.

6. An optical transceiver used in a bilateral transmission system for optical pulse information wherein:

a single optical fiber transmission line is laid between first and second positions;

optical pulse transmission time slots are set in said transmission line at fixed time intervals;

at least predetermined one of said optical pulse transmission time slots within a unit transmission unit period defined by a predetermined number of pulse periods is used as an up-link optical pulse transmission time slot for the transmission of up-link information pulses from said second position to said first position; and at least one time slot other than said up-link optical pulse transmission time slot in said unit transmission period is used as at least one down-link optical pulse transmission time slot for the transmission of down-link optical pulse transmission from said first position to said second position;

said optical transceiver placed at said second position, comprising:

an optical coupler-splitter connected to said bilateral optical fiber transmission line;

a demodulator for demodulating optical pulses split by said optical coupler-splitter to produce demodulated information pulses;

a separating circuit for separating a clock pulse train of said up-link optical pulse transmission time slots and down-link subscriber information from said demodulated information pulses;

an optical gate controller for generating up-link subscriber information by said up-link information pulses in synchronization with time slots of said clock pulse train; and an optical gate circuit for sending, to said optical coupler-splitter, optical pulses obtained by gating said optical pulses split by said optical coupler-splitter so that said up-link subscriber information obtained at the output of said optical gate controller is provided on said optical fiber transmission line.

7. An optical transceiver according to claim 4 or 6, in which said optical gate circuit is a semiconductor laser amplifier.

8. An optical transceiver according to claim 6, in which said separating circuit comprises:

means for extracting clock pulses of said optical pulse transmission time slots from the output of said demodulator;

gate clock generator for frequency-dividing said clock pulses to generate clock pulses of a frequency 1/n (n being an integer equal to or greater than 2) of said unit transmission period;

a phase shifter for shifting clock timing of output pulses from said gate clock generator every k clocks;

a NOT circuit for outputting logical NOT of said output pulses of said phase shifter;

a first gate circuit for gating the demodulated information pulses from said demodulator with output pulses of said phase shifter to generate a clock pulse train of said up-link optical pulse transmission time slots;

a second gate circuit for gating the demodulated information pulses from said demodulator with output pulses from said NOT circuit to generate down-link subscriber information; and a detection circuit for K-counts of consecutive "1s" which stops a phase-shifting in said phase shifter only when the K-count of consecutive "1s" is detected from said first gate circuit.

9. An optical transceiver according to claim 4 or 6, in which said optical gate controller comprises:

a buffer memory for reading out therefrom a clock pulse train of said up-link pulse transmission time slots by inputting thereto said up-link subscriber information and for generating, as clock pulses, said up-link subscriber information synchronized with said clock pulse train;

means for adjusting the relative phase between said optical pulses incident on said optical gate circuit and said up-link subscriber information to synchronize timing of said up-link pulse transmission time slots with the timing of said up-link pulse transmission time slots in said optical pulses; and means for gating said optical gate circuit with timings of said up-link subscriber information.

* * * * *